United States Patent [19]

Ammer et al.

[11] Patent Number: 5,408,736

[45] Date of Patent: Apr. 25, 1995

[54] PROCESS OF MANUFACTURING A FRICTION RING FOR USE IN A CLUTCH OR BRAKE

[75] Inventors: Karl Ammer, Vorchdorf; Gerhard Hartner, Bad Wimsbach-Neydharting; Rudolf Geissler, Kirchdorf, all of Austria

[73] Assignee: Miba Sintermetall Aktiengesellschaft, Laakirchen, Austria

[21] Appl. No.: 159,803

[22] Filed: Nov. 30, 1993

[30] Foreign Application Priority Data

Dec. 14, 1992 [AT] Austria .................. 2465/92

[51] Int. Cl.⁶ .............................................. B23P 17/00
[52] U.S. Cl. ............................... 29/527.2; 192/107 M
[58] Field of Search ............ 29/527.1, 527.2, 898.057, 29/898.058; 192/107 M, 53 F, 53 R; 419/38, 41

[56] References Cited

U.S. PATENT DOCUMENTS

| | | | |
|---|---|---|---|
| 4,770,283 | 9/1988 | Pütz et al. | 29/527.2 |
| 4,931,117 | 6/1990 | Müller et al. | 192/107 M |
| 5,105,522 | 4/1992 | Gramberger et al. | 192/107 M |
| 5,143,192 | 9/1992 | Vojacek et al. | 29/527.2 |

FOREIGN PATENT DOCUMENTS

385826 5/1988 Austria .
0220852 5/1987 European Pat. Off. .

*Primary Examiner*—Irene Cuda
*Assistant Examiner*—David P. Bryant
*Attorney, Agent, or Firm*—Collard & Roe

[57] ABSTRACT

A process is described for manufacturing a friction ring for use in a clutch or brake. The friction ring comprises a friction lining provided on at least one peripheral surface of a conical or cylindrical carrying ring, which has been formed from a flat sheet metal blank after coating comprising a power mixture has been formed on the flat sheet metal blank. The process comprises providing a flat sheet metal blank, admixing a curable synthetic resin binder to the powder mixture to provide a binder-containing mixture, applying the binder-containing mixture to the blank to form a coating thereon, partly setting the coating, subsequently shaping the blank with the coating to form the carrying ring, and curing the coating on the carrying ring to form the friction lining.

17 Claims, No Drawings

PROCESS OF MANUFACTURING A FRICTION RING FOR USE IN A CLUTCH OR BRAKE

BACKGROUND OF THE INVENTION

1. Field of the Invention

This invention relates to a process of manufacturing a friction ring for use in a clutch or brake, which friction ring comprises a friction lining provided on at least one peripheral surface of a conical or cylindrical carrying ring, which has been formed from a flat sheet metal blank after a coating comprising a powder mixture has been formed on the flat sheet metal blank.

2. Description of the Prior Art

To permit a simple manufacture of friction rings which are intended for use in clutches or brakes and comprise a friction lining which has been sinter-bonded to the carrying ring, it has been disclosed in Austrian Patent Specification 385,826 to plank the carrying ring from flat sheet metal and to provide said carrying ring while it is still flat with a sinter-bonded friction lining on at least one of its surfaces which are intended to form the conical or cylindrical peripheral surfaces and subsequently to shape the flat carrying ring to the desired conical or cylindrical shape between the female die and punch of a shaping tool. But the sintered friction lining cannot be shaped together with the sheet metal ring unless the sintered friction lining has a sufficient ductility. This requirement imposes limits as regards the composition which may be selected for the sintered friction lining. For this reason it is usual to use sintered friction linings which comprise non-ferrous heavy metals, which in contact with transmission oils having a high additive content, e.g., tend to form sulfides, which adversely affect the performance of the friction lining. On the other hand, the ductility requirement precludes a decrease of the non-ferrous heavy metal content of the friction lining in favor of other metals, such as iron.

SUMMARY OF THE INVENTION

It is an object of the invention to eliminate the disadvantages outlined hereinbefore and to provide for the manufacture of a friction ring of the kind described first hereinbefore a process which is improved in that the composition of the friction lining can be selected with a view to the performance requirements to be met by the friction lining and the material for the friction lining can be applied in a simple manner to a flat sheet metal blank.

That object is accomplished in accordance with the invention in that the powder mixture for making the friction lining is mixed with a curable synthetic resin binder to form a binder-containing mixture, which is then applied to the flat sheet metal blank to form a coating thereon, said coating is partly set, the sheet metal blank provided with the partly set coating is shaped to form the carrying ring and the coating on the shaped carrying ring is subsequently fully cured.

Because a synthetic resin binder has been admixed to the powder mixture used to make the friction lining, the binder-containing mixture which has been applied to the flat sheet metal blank can be sufficiently set in that the synthetic resin binder is partly cured and the sheet metal blank coated with the binder-containing mixture can then be shaped to form the friction ring. Because the synthetic resin binder contained in the binder-containing coating is not fully cured until the flat sheet metal blank has been shaped to form the carrying ring, the binder-containing coating has before the shaping of the sheet metal blank a ductility which is sufficient to facilitate the shaping. On the other hand, the full curing of the binder after the shaping of the flat sheet metal blank ensures that the friction lining of the finished friction ring will have the required coherence.

Because the friction lining contains a synthetic resin binder, the composition of the friction lining may be selected in wide ranges with a view to the requirements to be met in a specific case. For instant, a high resistance to the action of transmission oils having a high additive content can be achieved in that the content of sulfide-forming components, such as copper and its alloys, in the friction lining is decreased or eliminated. Because the friction lining may have a high metal content, it will have a high thermal stability in spite of the presence of a synthetic resin binder because heat can be dissipated through the metal contained in the friction lining. Besides, the synthetic resin binder may be sufficiently elastic to compensate slight deviations of the friction lining from a desired geometric configuration. Moreover, the synthetic resin bond imparts vibrations-damping and sound-damping and sound-damping properties to the friction lining.

It is desirable to use a synthetic resin binder which comprises epoxy resins, phenolic resins, silicone resins, polyimides or mixtures thereof in an amount of 0.1 to 30% by weight of the binder-containing mixture. The amount in which the binder is used will depend on the content of fillers and additives contained in the synthetic resin. Epoxy or phenolic resins may be contained in the binder-containing mixture in an amount from 5 to 15% by weight with excellent results.

In the manufacture of a friction ring by the process in accordance with the invention it is possible to provide, e.g., a flat annular sheet metal blank although such an annular blank is not essential because flat metal strips can be curled in the process in accordance with the invention to form conical or cylindrical carrying rings. The flat sheet metal blank may be degreased and optionally roughened by grinding, sand-blasting or brushing. Because the friction lining contains a synthetic resin binder, it is recommendable to apply a synthetic resin primer consisting, e.g., of liquid synthetic resin, to the sheet metal blank by screen printing and to strew a synthetic resin powder to said primer.

DETAILED DESCRIPTION OF THE PREFERRED EMBODIMENT

For making the friction lining, the binder-containing mixture is strewed or pressed onto the flat sheet metal blank when it has been pretreated as outlined hereinbefore. If the binder-containing mixture is pressed onto the sheet metal blank, that pressing operation may be used also to form grooves in the binder coating. Alternatively, the friction lining may be applied to the sheet metal blank by injection molding. In addition to the synthetic resin binder, the friction lining may comprise various powder mixtures. For instance, friction linings may be made which contain iron powder with and or without organic or inorganic additives or which contain brass or bronze powder or organic or inorganic frictional materials and fillers. When the flat sheet metal blank has been provided with the coating, it is heated in a continuous furnace or in a heatable press so that the synthetic resin binder is partly set. Where the binder-containing mixture contains epoxy or phenolic resin, said partial setting can be effected by a treatment at 110° C. for 30 minutes in a continues furnace.

In order to reduce the notch crack sensitivity the workpiece when it is still substantially flat may be rounded at its edges before it is shaped by embossing or deep drawing. When the flat sheet metal blank has been shaped to form the friction ring, the synthetic resin binder is fully cured, e.g., by a treatment at 200° C. for 60 minutes in a continuous furnace. The cylindrical or conical friction ring which has thus been made is processed further by conventional methods, in which the workpiece is subjected to a calibrating operation, in which grooves may be formed in the friction lining.

It will be understood that the synthetic resin binder may comprise two components, one of which is used to bond the binder-containing coating before the sheet metal blank is shaped to form the carrying ring and the other of which is used to fully cure the friction lining on the shaped carrying ring.

We claim:

1. A process of manufacturing a friction ring comprising a carrying ring, which has inside and outside annular peripheral surfaces and is provided on at least one of said surfaces with a friction lining made of a powder mixture, which comprises providing a flat sheet metal blank, admixing a curable synthetic resin binder to said powder mixture to provide a binder-containing mixture, applying said binder-containing mixture to said blank to form a coating thereon, partly curing said synthetic resin binder in said coating, subsequently shaping said blank with said coating to form said carrying ring, and curing said coating on said carrying ring to form said friction lining.

2. The process set forth in claim 1 as applied to the manufacture of a friction ring in which said carrying ring has cylindrical inside and outside peripheral surfaces.

3. The process set forth in claim 1 as applied to the manufacture of a friction ring in which said carrying ring has conical inside and outside peripheral surfaces.

4. The process set forth in claim 1 as applied to the manufacture of a friction ring for use in a clutch.

5. The process set forth in claim 1 as applied to the manufacture of a friction ring for use in a brake.

6. The process set forth in claim 1, wherein said synthetic resin binder is selected from the group consisting of epoxy resins, phenolic resins, silicone resins, polyimides or mixtures thereof.

7. The process set forth in claim 6, wherein said synthetic resin binder is admixed to said powder mixture in an amount of 0.1 to 30% by weight of said binder-containing mixture.

8. The process set forth in claim 1, wherein said synthetic resin binder is selected from the group consisting of epoxy resins and phenolic resins and is admixed to said powder mixture in an amount from 5 to 15% by weight of said binder-containing mixture.

9. The process set forth in claim 1, wherein said synthetic resin binder in said coating is partly cured to set said coating.

10. The process set forth in claim 1, wherein said synthetic resin binder is fully cured to an elastic state after shaping said blank with said coating to form said carrying ring.

11. The process set forth in claim 1, wherein said synthetic resin binder is admixed as a powder to said powder mixture.

12. The process set forth in claim 1, wherein said powder mixture comprises iron powder.

13. The process set forth in claim 12, wherein said powder mixture comprises iron powder and additives selected from the group consisting of inorganic and organic additives.

14. The process set forth in claim 1, wherein said powder mixture comprises a metal powder selected from the group consisting of bronze and brass powders.

15. The process set forth in claim 1, wherein said powder mixture comprises powders selected from the group consisting of organic and inorganic friction-enhancing materials and fillers.

16. The process set forth in claim 1, wherein said flat sheet metal blank provided with said coating is heated so that said synthetic resin binder is partly cured to set said coating.

17. The process set forth in claim 1, wherein:

said synthetic resin binder comprises first and second components, said first component is partly cured to set said coating before said blank is shaped to form said carrying ring, and said second component is cured on said carrying ring to form said friction lining.

* * * * *